US012756773B2

(12) United States Patent
Lin

(10) Patent No.: US 12,756,773 B2
(45) Date of Patent: Oct. 6, 2026

(54) COMMUNICATION DEVICE AND TWO-PHASE PACKET PARSER ENHANCEMENT METHOD WITH LOOPBACK UNIT

(71) Applicant: REALTEK SEMICONDUCTOR CORPORATION, Hsinchu (TW)

(72) Inventor: Yu-Hsiu Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 50 days.

(21) Appl. No.: 19/001,086

(22) Filed: Dec. 24, 2024

(65) Prior Publication Data

US 2025/0233933 A1 Jul. 17, 2025

(30) Foreign Application Priority Data

Jan. 17, 2024 (TW) ................................ 113101867

(51) Int. Cl.
*H04L 69/22* (2022.01)
*H04L 12/46* (2006.01)
*H04L 45/74* (2022.01)

(52) U.S. Cl.
CPC .......... *H04L 69/22* (2013.01); *H04L 12/4633* (2013.01); *H04L 45/74* (2013.01)

(58) Field of Classification Search
CPC ............................ H04L 69/22; H04L 12/4633
See application file for complete search history.

(56) References Cited

U.S. PATENT DOCUMENTS

| | | | | |
|---|---|---|---|---|
| 12,126,541 | B2 * | 10/2024 | Gafni | H04L 49/90 |
| 2015/0071283 | A1 * | 3/2015 | Hammond | H04L 12/2801 370/392 |
| 2015/0081726 | A1 * | 3/2015 | Izenberg | H04L 47/2433 707/755 |
| 2017/0063690 | A1 * | 3/2017 | Bosshart | H04L 45/54 |
| 2017/0104851 | A1 * | 4/2017 | Arangasamy | H04L 63/0428 |
| 2018/0091877 | A1 * | 3/2018 | Cremin | H04Q 11/0005 |
| 2025/0233932 | A1 * | 7/2025 | Xie | H04L 69/18 |

FOREIGN PATENT DOCUMENTS

| | | |
|---|---|---|
| CN | 112019420 A | 12/2020 |

OTHER PUBLICATIONS

OA letter of a counterpart TW application (appl. No. 113101867) mailed on Apr. 29, 2025.

* cited by examiner

*Primary Examiner* — Hieu T Hoang
(74) *Attorney, Agent, or Firm* — WPAT, PC

(57) ABSTRACT

A communication device includes a first parser circuit, a second parser circuit, and a forwarding circuit. The first parser circuit is configured to parse first data in a packet based on a tunneling protocol to obtain first parsing information and an offset value. The second parser circuit is configured to parse second data in the packet according to the offset value to obtain second parsing information, in which the offset value is utilized to indicate a starting position of the second data in the packet. The forwarding circuit is configured to forward the packet according to the first parsing information and the second parsing information.

19 Claims, 9 Drawing Sheets

COMMUNICATION DEVICE AND TWO-PHASE PACKET PARSER ENHANCEMENT METHOD WITH LOOPBACK UNIT

BACKGROUND OF THE INVENTION

1. Field of the Invention

The present disclosure relates to a communication device, especially a communication device that utilizes two-phase packet parsing to process packets supporting tunneling protocol and a packet processing method thereof.

2. Description of Related Art

With the development of technology, communication applications supporting tunneling protocols are becoming increasingly popular. Based on the tunneling protocol, an original packet is appended with an additional header that is utilized to indicate information related to the tunneling protocol. In other words, packets established based on the tunneling protocol will have larger data sizes (or longer data lengths). In the existing approaches, if the data size of this packet exceeds a parsing capacity of a packet parser, the system will forward the packet to a central processing unit, which then executes a corresponding software to parse the packet. As a result, the load on the central processing unit is increased, which reduces the efficiency of overall system in processing other data or forwarding packets.

SUMMARY OF THE INVENTION

In some aspects, an object of the present application is, but not limited to, provide a communication device that utilizes two-phase packet parsing to handle packets supporting tunneling protocols and a packet processing method thereof, so as to make an improvement to the prior art.

In some aspects of the present disclosure, a communication device includes a first parser circuit, a second parser circuit, and a forwarding circuit. The first parser circuit is configured to parse first data in a packet based on a tunneling protocol to obtain first parsing information and an offset value. The second parser circuit is configured to parse second data in the packet according to the offset value to obtain second parsing information, in which the offset value is utilized to indicate a starting position of the second data in the packet. The forwarding circuit is configured to forward the packet according to the first parsing information and the second parsing information.

In some aspects of the present disclosure, a packet processing method includes the following operations: parsing, by a first parser circuit, first data in a packet based on a tunneling protocol and generating an offset value to obtain first parsing information; parsing, by a second parser circuit, the second data in the packet according to the offset value to obtain second parsing information, in which the offset value is utilized to indicate a starting position of the second data in the packet; and forwarding the packet according to the first parsing information and the second parsing information.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For case of understanding, like elements in various figures are designated with the same reference number.

Figure 1:
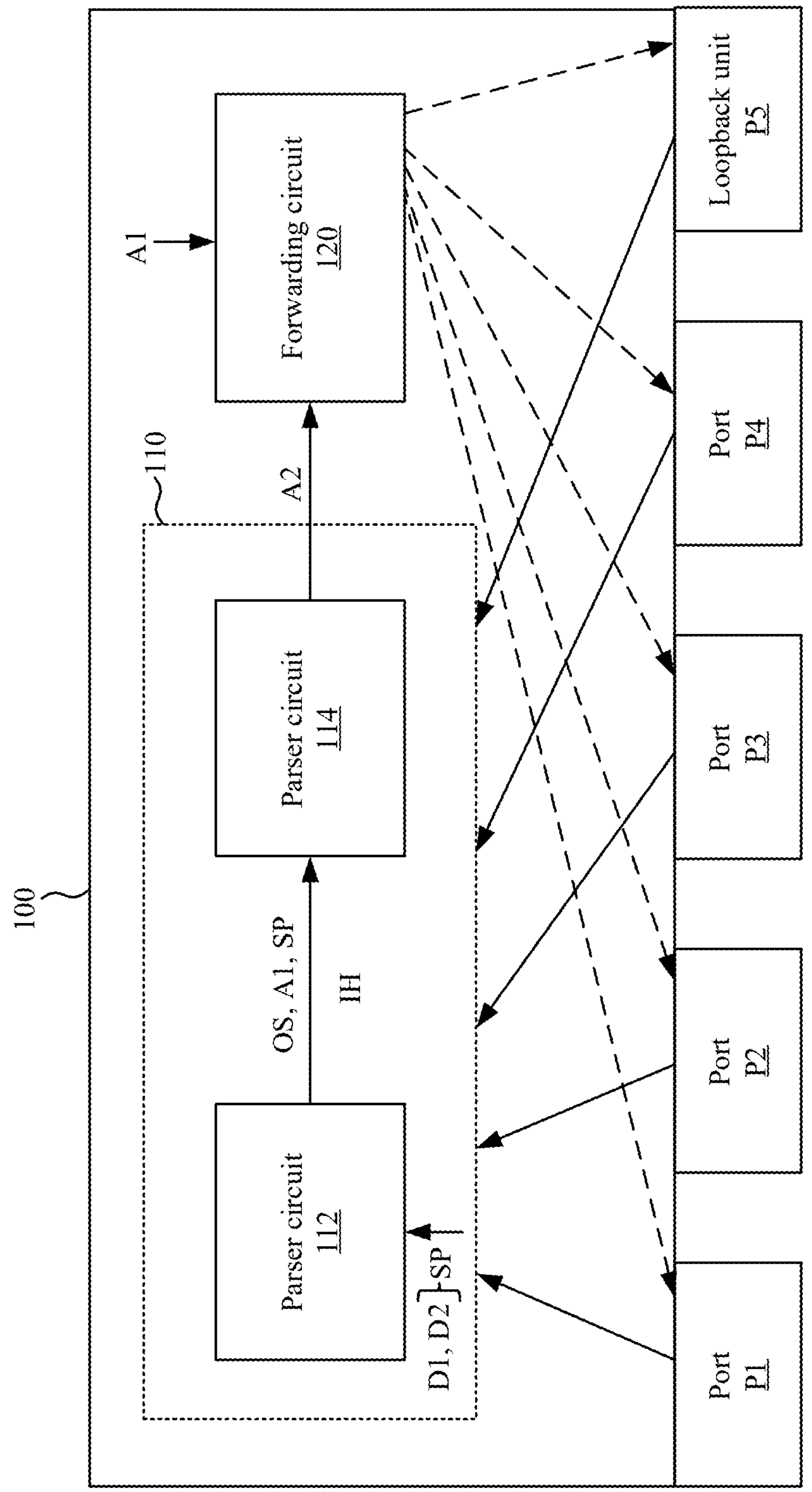
FIG. 1 illustrates a schematic diagram of a communication device according to some embodiments of the present disclosure.

FIG. 1 illustrates a schematic diagram of a communication device 100 according to some embodiments of the present disclosure. In some embodiments, the communication device 100 may be various types of network devices, such as, but not limited to, a switch. The communication device 100 includes ports P1-P4, a loopback unit P5, a packet parser 110, and a forwarding circuit 120. The ports P1-P4 may be coupled to different electronic devices (not shown) to exchange packets with each other.

The packet parser 110 may utilize time-division multiplexing (TDM) mechanism to process packets received via the ports P1-P4 and the loopback unit P5. For example, the packet parser 110 includes a circuit that may execute the TDM mechanism to alternately receive packets from the ports P1-P4 and the loopback unit P5, and sequentially parse the received packets (labeled as packet SP). In some embodiments, the packet parser 110 may utilize a two-phase parsing to processes the packet SP. The packet parser 110 may parse an outer data field of the packet SP (later labeled as data D1) according to a tunneling protocol during a first phase, which may include, for example but not limited to, an outer header defined in the tunneling protocol (hereinafter referred to as a tunnel header). Then, the packet parser 110 may parse the remaining data field of the packet SP (later labeled as data D2) during a second phase according to an Ethernet protocol, which may include, but is not limited to, an inner header. With the aforementioned configuration, the packet parser 110 may process the outer data D1 of the packet SP with a simple logic according to the tunneling protocol during the first phase and process the data D2 related mainly to the Ethernet protocol during the second phase.

In some embodiments, the packet parser 110 includes a parser circuit 112 and a parser circuit 114. The parser circuit 112 is configured to parse the data D1 of the packet SP based on the tunneling protocol to obtain parsing information A1 and an offset value OS. As mentioned earlier, the data D1 is the outer data field. In some embodiments, if the packet SP supports a tunneling protocol, the data D1 may include one or more outer headers defined by the tunneling protocol. Under this condition, the parser circuit 112 may parse the data D1 according to the relevant rules of the tunneling protocol to obtain the parsing information A1. In some embodiments, the parsing information A1 may include, but is not limited to, a source internet protocol (IP) address and a destination IP address corresponding to the tunnel, a protocol type, and other information related to the tunneling protocol.

In some embodiments, the offset value OS may indicate the starting position of the data D2 in the packet SP. For example, if the data size of the packet SP is 1500 bytes, the parser circuit 112 may determine that the first 200 bytes of the packet SP belong to the tunnel header and can be fully parsed in a single operation. Under this condition, the packet parser 110 may parse these 200 bytes, the data D1) and generate the corresponding offset value OS to indicate that the remaining data (i.e., the data D2) starts at byte 201. In other words, the offset value OS may be utilized to indicate the boundary between the data D1 and the data D2. The above-mentioned values and data lengths are provided for illustrative purposes only and the present disclosure is not limited thereto.

The parser circuit 114 is configured to parse the remaining data field (i.e., data D2) in the packet SP according to the offset value OS to obtain parsing information A2. In some embodiments, if the packet SP supports the tunneling protocol, the data D2 may include one or more inner headers or general Ethernet frames. Under this condition, the parser circuit 114 may parse the data D2 according to the relevant rules of the Ethernet protocol to obtain the parsing information A2. In some embodiments, the parsing information A2 may include, but is not limited to, the original source IP address, the final destination IP address, the upper-layer protocol type, other information related to the protocol, and the payload. In some embodiments, each of the parser circuit 112 and the parser circuit 114 may be implemented with a digital processing circuit that performs packet parsing according to a predetermined algorithm.

In some embodiments, the parser circuit 112 may further parse the data D1 in the packet SP to obtain inner header type information IH and transfer the inner header type information IH and the offset value OS to the parser circuit 114. In some embodiments, the inner header type information IH may be utilized to indicate whether the data D2 is an inner header with a special format. For example, if the parser circuit 112 determines that the inner header type is not specified in the data D1, the parser circuit 114 may consider the data D2 as a general Ethernet frame. Alternatively, if the parser circuit 112 determines that the data D1 specifies the inner header type, the parser circuit 114 may recognize the data D2 as an Ethernet frame with a special format (e.g., without a layer 2 (L2) header, as shown in packet SP of FIG. 2B). Thus, the parser circuit 114 may apply the corresponding parsing rules based on the inner header type information IH to parse the data D2, thereby obtaining more accurate parsing information A2. In other words, the parser circuit 114 may parse the data D2 according to the offset value OS and the inner header type information IH. In some embodiments, the inner header type information IH may be utilized to indicate whether the data D2 is an L2 header, thus informing the parser circuit 114 on how to parse the data D2. In some embodiments, the inner header type information IH may be selectively set according to the actual application requirements.

As mentioned above, the parsing information A1 and parsing information A2 include the destination IP address and the final destination IP address corresponding to the tunnel. Therefore, the forwarding circuit 120 may forward the packet SP according to the parsing information A1 and parsing information A2. For example, if the packet parser 110 receives the packet SP from port P1, the forwarding circuit 120 may forward the packet SP to an electronic device coupled to port P2 according to the parsing information A1 and parsing information A2. Alternatively, as will be discussed in the first to third scenarios later, the forwarding circuit 120 may also transmit at least part of the data in the packet SP to the loopback unit P5 according to the parsing information A1, the parsing information A2, and the offset value OS, thus sending the at least part of the data back to the packet parser 110 via the loopback unit P5 for a second round of parsing. In some embodiments, the loopback unit P5 may be a physical (or virtual) port with a loopback mode. In some embodiments, the loopback unit P5 may be implemented with an application-specific integrated circuit (ASIC) with a loopback function. In some embodiments, the "loopback" indicates that signals or data from the output of the communication device 100 are directly directed back to the input of the communication device 100. The above configurations of the loopback unit P5 are given for illustrative purposes only, and the present disclosure is not limited thereto. In some embodiments, the forwarding circuit 120 may be implemented with data transmission circuits controllable by digital signals or instructions.

The above configurations related to the communication device 100 are given for illustrative purposes only, and the present disclosure is not limited thereto. For example, in different embodiments, the communication device 100 may have a different number of ports. On the other hand, the communication device 100 may also include one or more storage circuits (not shown), which may be utilized to store metadata obtained by parsing the packet SP, so that the packet parser 110, the forwarding circuit 120, and/or the loopback unit P5 may perform related operations according to the metadata.

Figure 2A:
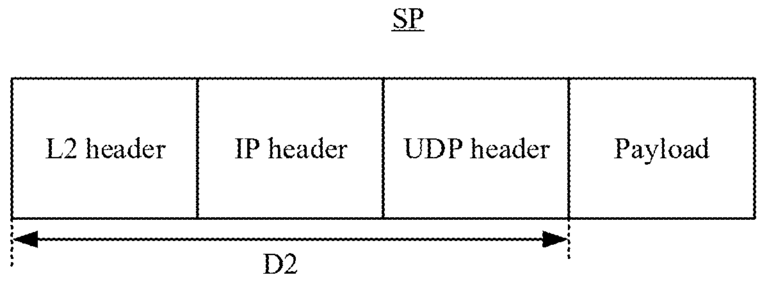
FIG. 2A illustrates a schematic diagram of the format of the packet in FIG. 1 according to some embodiments of the present disclosure.

FIG. 2A illustrates a schematic diagram of the format of the packet SP in FIG. 1 according to some embodiments of the present disclosure. As shown in FIG. 2A, the packet SP is a general Ethernet frame, which is a regular packet not encapsulated by a tunneling protocol. The packet SP sequentially includes an L2 header, an IP header, a user datagram protocol (UDP) header, and a payload. When the packet SP in FIG. 2A is received, the parser circuit 112 may quickly determine that the packet SP does not include a tunnel header (i.e., does not include data D1) and therefore determines that the packet SP is a general Ethernet frame. Under this condition, the parser circuit 112 may output an offset value OS having a value of 0 and transmit the packet SP and the offset value OS to the parser circuit 114. As a result, the parser circuit 114 may parse the packet SP according to the offset value OS, so as to generate the parsing information A2. In some embodiments, the L2 header may sequentially include a destination media access control (MAC) address (DMAC), a source MAC address (SMAC), an Ether type data field, and so on.

Figure 2B:
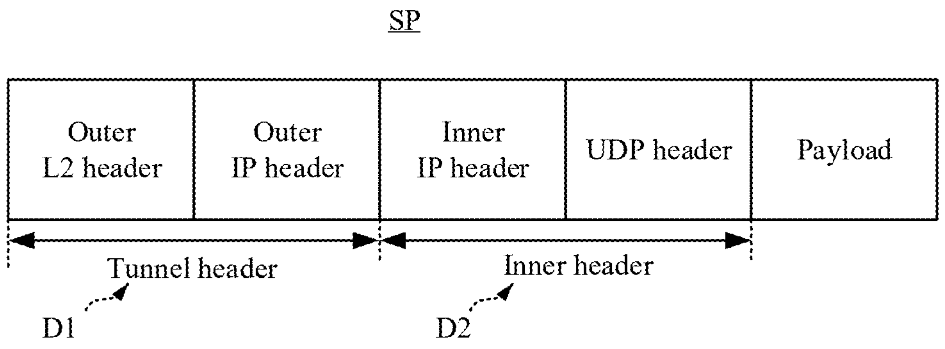
FIG. 2B illustrates a schematic diagram of the format of the packet in FIG. 1, according to some embodiments of the present disclosure.

FIG. 2B illustrates a schematic diagram of the format of the packet SP in FIG. 1, according to some embodiments of the present disclosure. As shown in FIG. 2B, the packet SP is a packet encapsulated according to the tunneling protocol, and sequentially includes an outer L2 header, an outer IP header, an inner IP header, a UDP header, and a payload. The outer L2 header and the outer IP header are tunnel headers set based on the tunneling protocol (i.e., the data D1), while the inner IP header and the UDP header are inner headers. Different from the general Ethernet frames, in this example, the inner headers do not include an L2 header (i.e., in this case, the packet SP is an Ethernet frame with a special format). As previously mentioned, the parser circuit 112 may obtain the inner header type information IH by parsing the tunnel headers, in order to inform the parser circuit 114 that the data D2 does not include an L2 header. As a result, the parser circuit 114 may use parsing rules suitable for this special format to process the data D2, thereby correctly obtaining the parsing information A2. In some embodiments, the packet SP in FIG. 2B may be a packet that is set according to the IP-in-IP tunneling protocol.

Figure 2C:
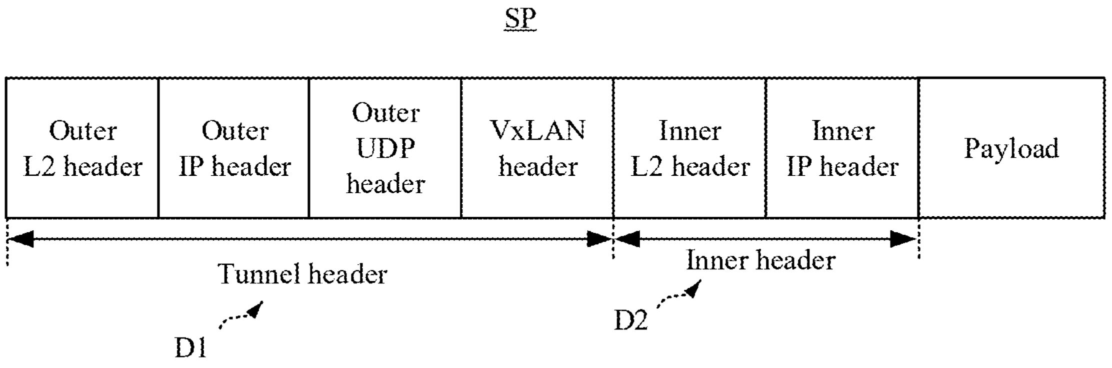
FIG. 2C illustrates a schematic diagram of the format of the packet in FIG. 1, according to some embodiments of the present disclosure.

FIG. 2C illustrates a schematic diagram of the format of the packet SP in FIG. 1, according to some embodiments of the present disclosure. As shown in FIG. 2C, the packet SP is a packet encapsulated according to a tunneling protocol, and sequentially includes an outer L2 header, an outer IP header, an outer UDP header, a Virtual Extensible LAN (VxLAN) header, an inner L2 header, an inner IP header, and a payload. The outer L2 header, the outer IP header, the outer UDP header, and the VxLAN header are tunnel headers set according to the tunneling protocol (i.e., the data D1), while the inner L2 header and inner IP header are inner headers. In this example, the packet SP is an Ethernet frame with a standard format. The parser circuit 112 may parse the VxLAN header to identify the inner header type information IH, in order to inform the parser circuit 114 that the data D2 includes an L2 header. As a result, the parser circuit 114 may use the parsing rules suitable for a standard Ethernet frame format to parse the packet SP.

Figure 3A:
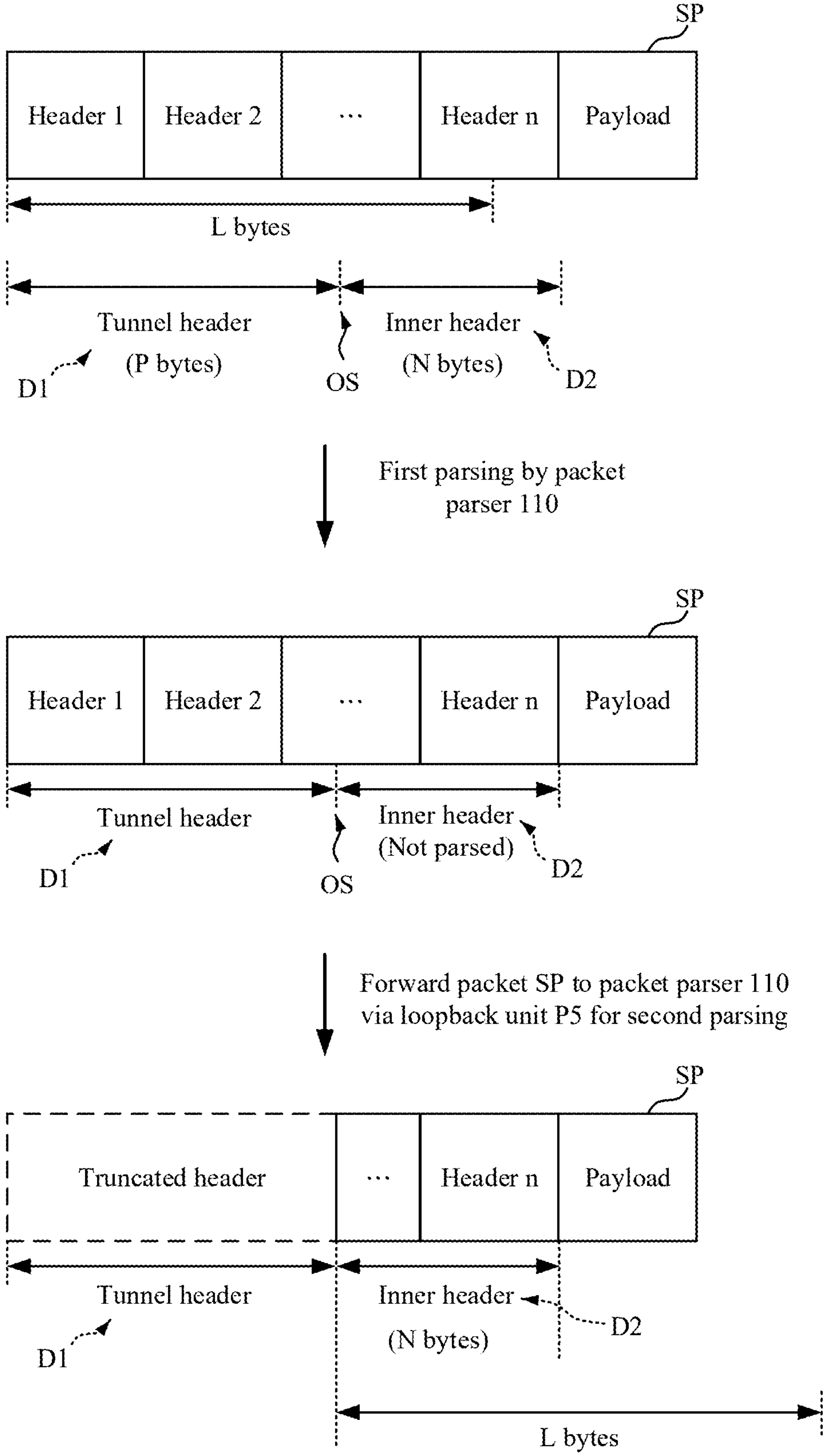
FIG. 3A illustrates a schematic diagram illustrating the operation of the packet parser when the packet in FIG. 1 is under a first scenario according to some embodiments of the present disclosure.

FIG. 3A illustrates a schematic diagram illustrating the operation of the packet parser 110 when the packet SP in FIG. 1 is under a first scenario according to some embodiments of the present disclosure. In practical applications, the packet parser 110 has a limitation on a maximum data size that can be parsed in each parsing process. For example, a maximum data size (or amount of data) that both the parser circuit 112 and the parser circuit 114 are able to parse in a single parsing process is L bytes, where the value L is a positive integer greater than 0. In the first scenario shown in FIG. 3A, the data size of the data D1 parsed by the parser circuit 112 is P bytes (i.e., the offset value OS is P), and the sum of the offset value OS and the data size (e.g., N bytes, where N is a positive number greater than 0) of the remaining data in the packet SP (i.e., data D2, which corresponds to the inner header) exceeds a predetermined value (which is to indicate the aforementioned maximum data size, such as the value L). In other words, in this first scenario, the data size of the packet SP exceeds the maximum data size (e.g., L bytes).

Figure 3B:
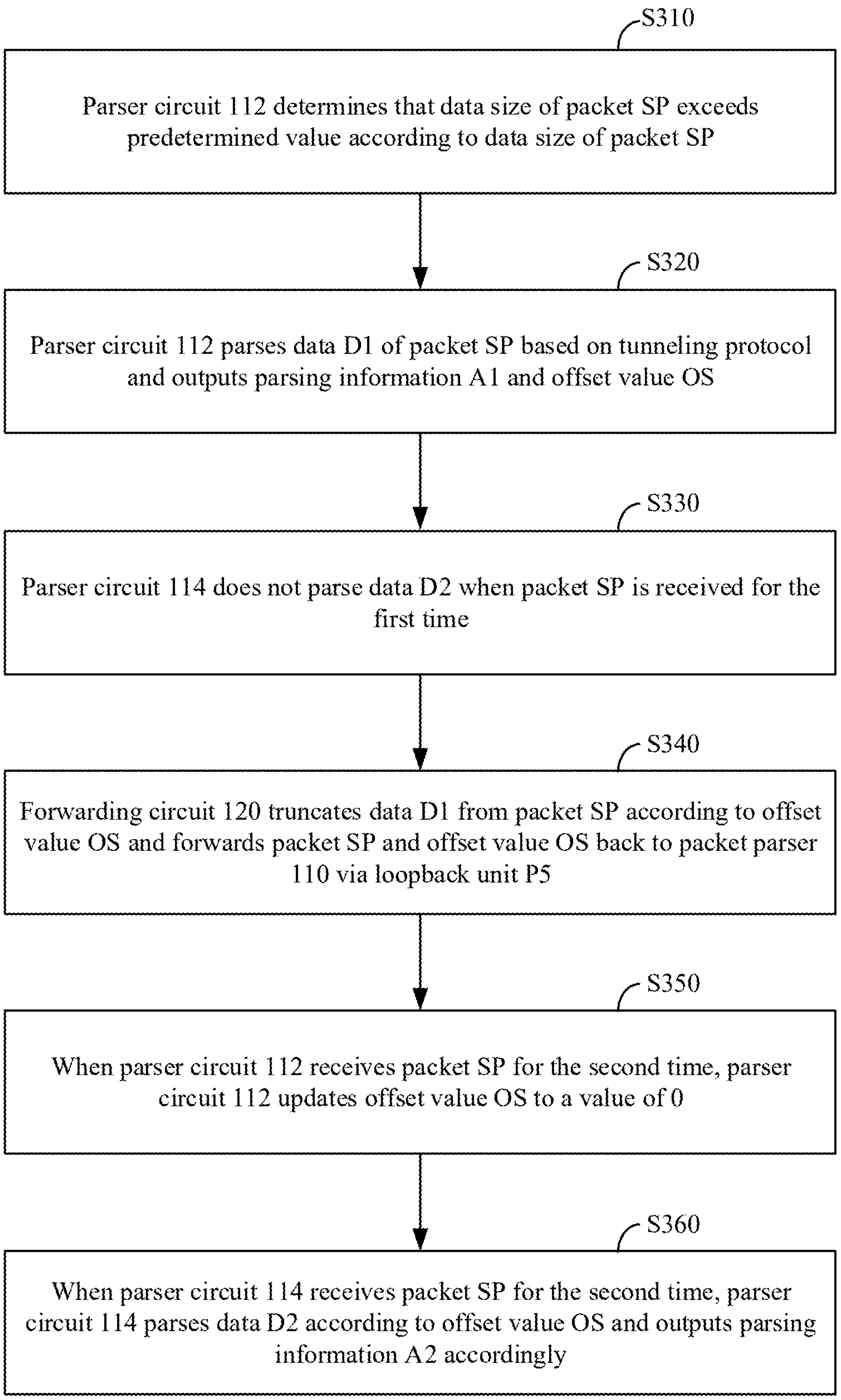
FIG. 3B illustrates a flowchart illustrating the operation of the communication device in FIG. 1 under the first scenario shown in FIG. 3A according to some embodiments of the present disclosure.

FIG. 3B illustrates a flowchart illustrating the operation of the communication device 100 in FIG. 1 under the first scenario shown in FIG. 3A according to some embodiments of the present disclosure. In operation S310, the parser circuit 112 determines that the data size of the packet SP exceeds the predetermined value (for example, the value L) according to the data size of the packet SP. In operation S320, the parser circuit 112 parses the data D1 of the packet SP based on the tunneling protocol and outputs the parsing information A1 and the offset value OS. In operation S330, the parser circuit 114 does not parse the data D2 when the parser circuit 114 receives the packet SP for the first time (as the data size of the packet SP exceeds the maximum data size able to be parsed in a single parsing). In operation S340, the forwarding circuit 120 truncates the data D1 from the packet SP according to the offset value OS and forwards the packet SP (excludes the data D1 at this time) and the offset value OS back to the packet parser 110 via the loopback unit P5. In operation S350, when the parser circuit 112 receives the packet SP for the second time, the parser circuit 112 updates the offset value OS to a value of 0. In operation S360, when the parser circuit 114 receives the packet SP for the second time, the parser circuit 114 parses the data D2 according to the offset value OS and outputs the parsing information A2 accordingly.

As shown in FIG. 3A, due to the large size of the packet SP, in the first parsing, the parser circuit 112 will parse the tunnel header (i.e., the data D1) in the packet SP, while the parser circuit 114 does not parse the remaining data (i.e., the data D2) in the packet SP. Then, the forwarding circuit 120 may utilize the loopback unit P5 to truncate the data D1 (i.e., the part of the data that has already been processed by the parser circuit 112) from the packet SP and forward the remaining data in the packet SP (including the data D2 and the payload) to the packet parser 110 for a second parsing. In other words, with the above operations, the data size that needs to be processed by the second parsing of the packet parser 110 can be reduced. For example, the remaining data of the packet SP to be parsed by the second parsing may be N bytes, which is less than the aforementioned L bytes. As a result, the packet parser 110 may utilize the loopback unit P5 to perform multiple rounds of parsing on the packet SP with an excessive data size, thereby obtaining the complete parsing information A1 and parsing information A2.

Figure 4A:
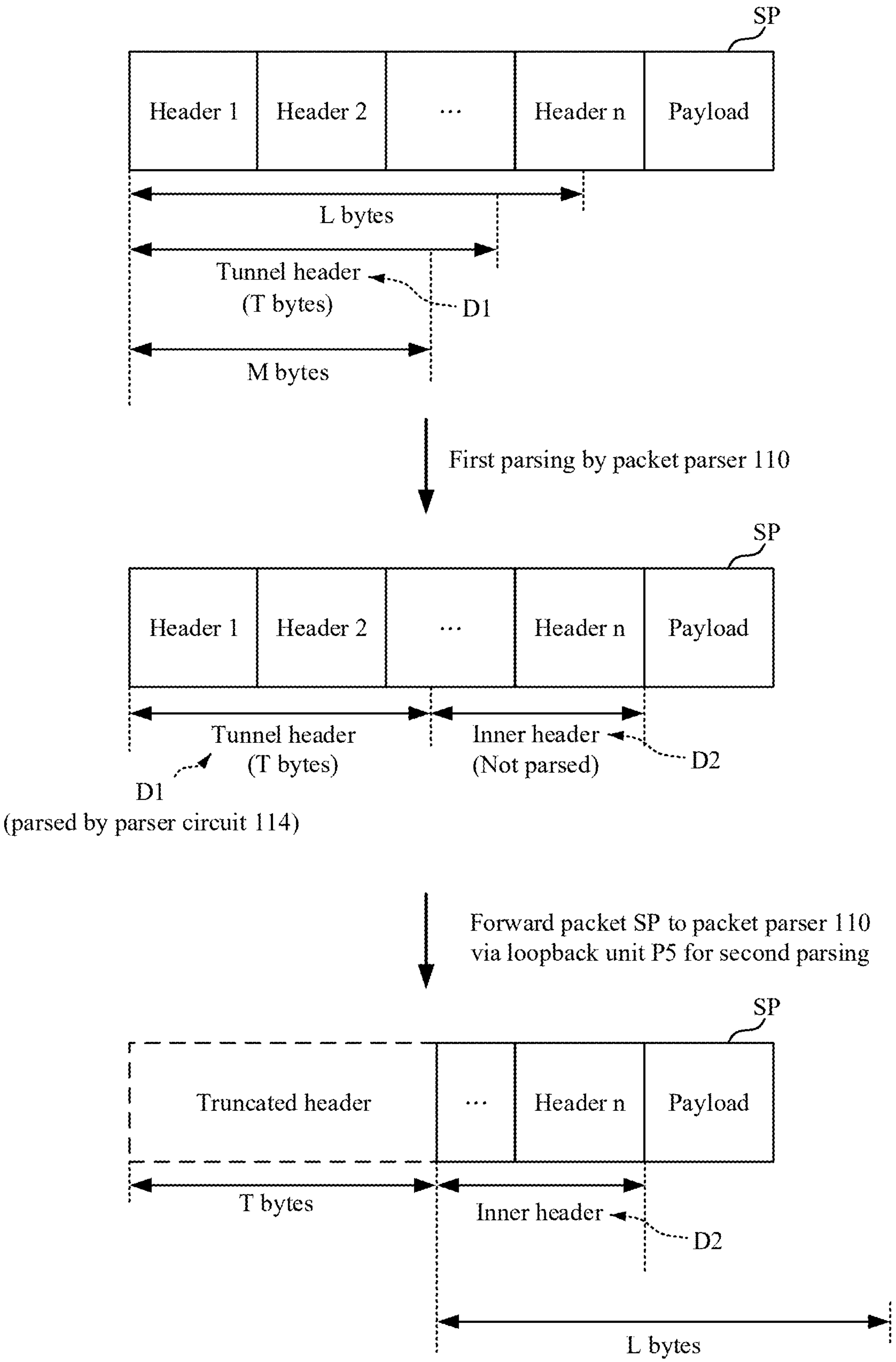
FIG. 4A illustrates a schematic diagram illustrating the operation of the packet parser when the packet in FIG. 1 is under a second scenario according to some embodiments of the present disclosure.

FIG. 4A illustrates a schematic diagram illustrating the operation of the packet parser 110 when the packet SP in FIG. 1 is under a second scenario according to some embodiments of the present disclosure. As mentioned above, in practical applications, the packet parser 110 has a limitation on the maximum data size (or amount of data) able to be parsed during a single parsing process. In greater detail, each of the parser circuits 112 and 114 has a limitation on the maximum data size (or amount of data) able to be parsed during a single parsing process. As the parser circuit 112 processes the data D1 in the packet SP based on the tunneling protocol with the simple logic during the first phase, the maximum data size that the parser circuit 112 is able to parse in a single parsing process is smaller than the maximum data size that the parser circuit 114 is able to parse in a single parsing process. For example, as mentioned above, the maximum data size (or amount of data) that both of the parser circuits 112 and 114 are able to parse in a single parsing process is L bytes. In the second scenario shown in FIG. 4A, the data size of the tunnel header (i.e., the data D1) is T bytes, which is larger than the maximum data size that the parser circuit 112 is able to parse in a single parsing process (for example, M bytes, where both values M and T are positive integers greater than 0, and T is greater than M). In other words, in the second scenario, the data size of the data D1 (e.g., T bytes) exceeds a predetermined value (which may be the value M, utilized to indicate the maximum data size that the parser circuit 112 is able to parse in a single parsing process).

Figure 4B:
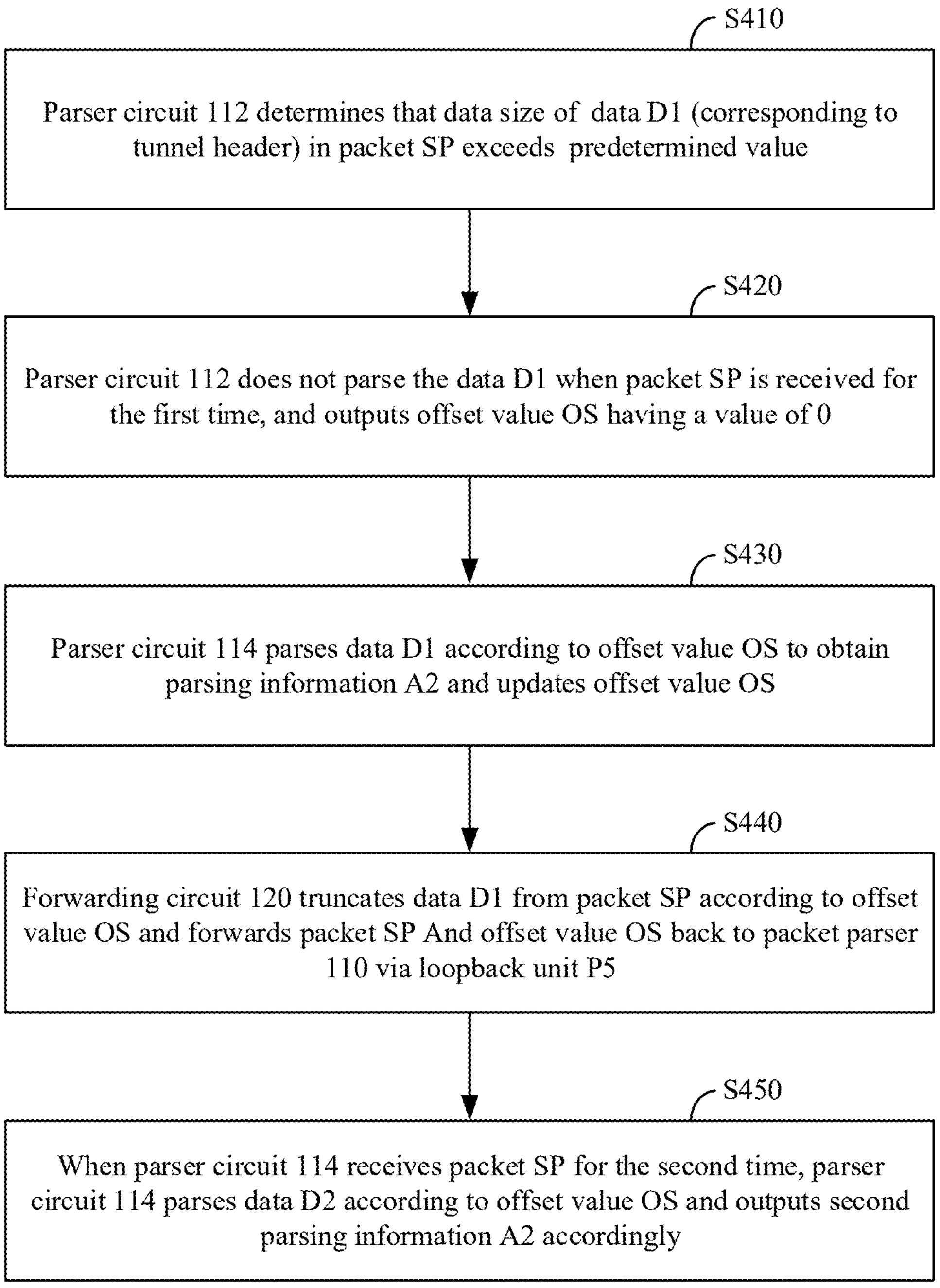
FIG. 4B illustrates a flowchart illustrating the operation of the communication device in FIG. 1 under the second scenario shown in FIG. 4A according to some embodiments of the present disclosure.

FIG. 4B illustrates a flowchart illustrating the operation of the communication device 100 in FIG. 1 under the second scenario shown in FIG. 4A according to some embodiments of the present disclosure. In operation S410, the parser circuit 112 determines that the data size of the data D1 (corresponding to the tunnel header) in the packet SP exceeds a predetermined value (for example, the value M). In operation S420, the parser circuit 112 does not parse the data D1 when the packet SP is received for the first time (as the data size of data D1 exceeds the maximum data size able to be parsed in a single parsing process), and outputs the offset value OS having a value of 0. In operation S430, the parser circuit 114 parses the data D1 according to the offset value OS to obtain the parsing information A2 and updates the offset value OS. In operation S440, the forwarding circuit 120 truncates the data D1 from the packet SP according to the offset value OS and forwards the packet SP (excludes the data D1 at this time) and the offset value OS back to the packet parser 110 via the loopback unit P5. In operation S450, when the parser circuit 114 receives the packet SP for the second time, the parser circuit 114 parses the data D2 according to the offset value OS and outputs the second parsing information A2 accordingly.

As shown in FIG. 4A, as the data size of data D1 exceeds the maximum data size that the parser circuit 112 is able to parse in a single operation, the parser circuit 112, although the data D1 is received during the first parsing, does not process the data D1 and outputs the offset value OS having a value of 0. As the offset value OS is 0, it indicates that the starting position of the data D2 is 0. Therefore, the parser circuit 114 will consider the data D1 as the data D2 and parse the data D2, thereby obtaining the parsing information A2 (which is equivalent to the parsing information A1 obtained from the data D1). Afterwards, the forwarding circuit 120 may utilize the loopback unit P5 to truncate the portion of the packet SP that has already been processed by the parser circuit 114 (for example, T bytes as shown in FIG. 4A), and forward the remaining portion of the packet SP (for example, the data D2 and payload as shown in FIG. 4A) to the packet parser 110 for a second parsing. As a result, the packet parser 110 may utilize the loopback unit P5 to perform multiple rounds of parsing of the packet SP, thus obtaining the complete parsing information A1 (for example, the parsing information A2 obtained during the first parsing) and parsing information A2.

Figure 5A:
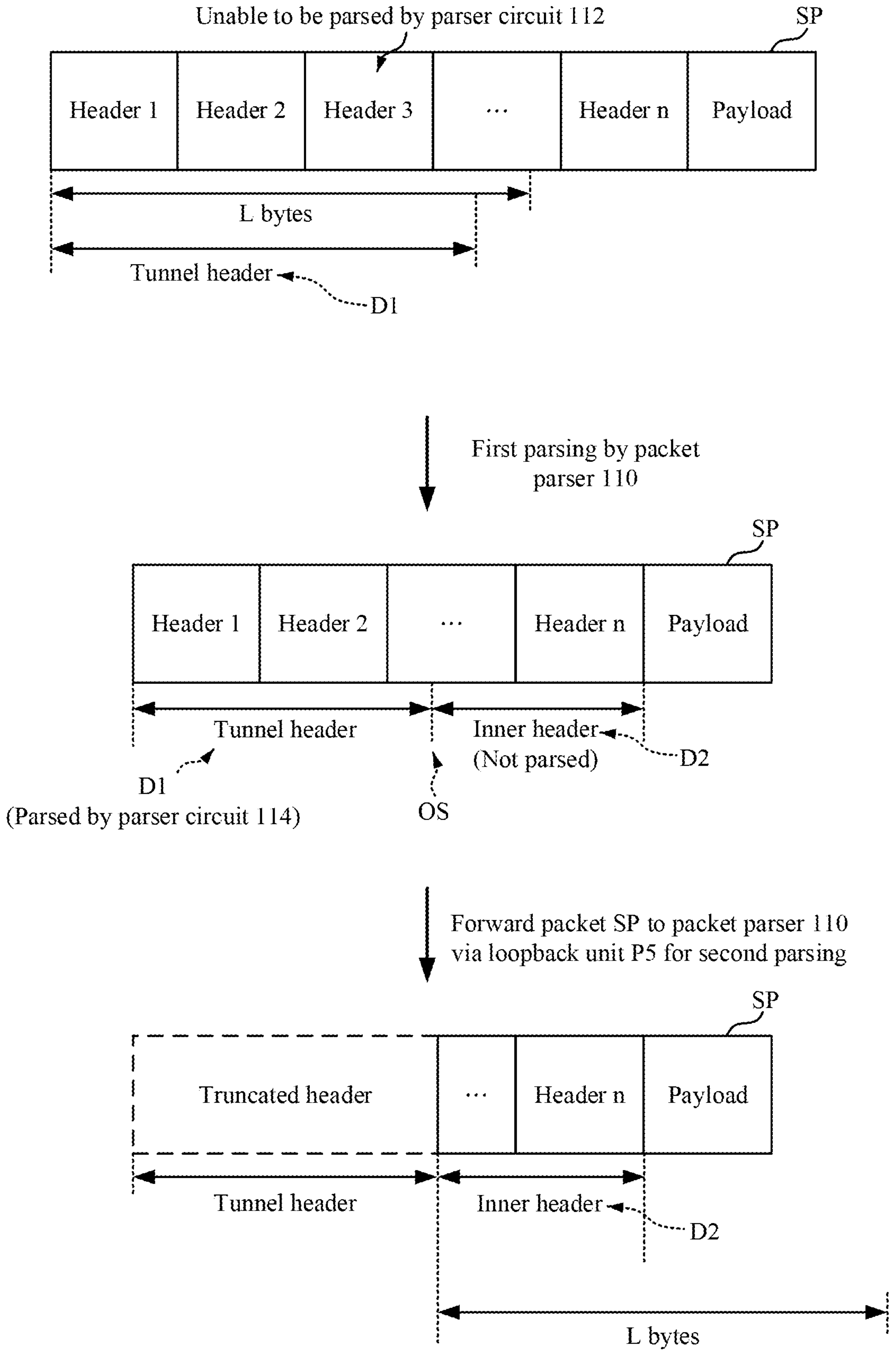
FIG. 5A illustrates a schematic diagram illustrating the operation of the packet parser when the packet in FIG. 1 is under a third scenario according to some embodiments of the present disclosure.

FIG. 5A illustrates a schematic diagram illustrating the operation of the packet parser 110 when the packet SP in FIG. 1 is under a third scenario according to some embodiments of the present disclosure. As mentioned above, as the parser circuit 112 processes the data D1 in the packet SP with the simple logic during the first phase, the types and sizes of data that the parser circuit 112 is able to parse are relatively limited (compared with the parser circuit 114). In the third scenario shown in FIG. 5A, the data D1 corresponding to the tunnel header includes data that cannot be parsed by the parser circuit 112 (e.g., header 3). In other words, in the third scenario, the data D1 includes a header that cannot be parsed by the parser circuit 112.

Figure 5B:
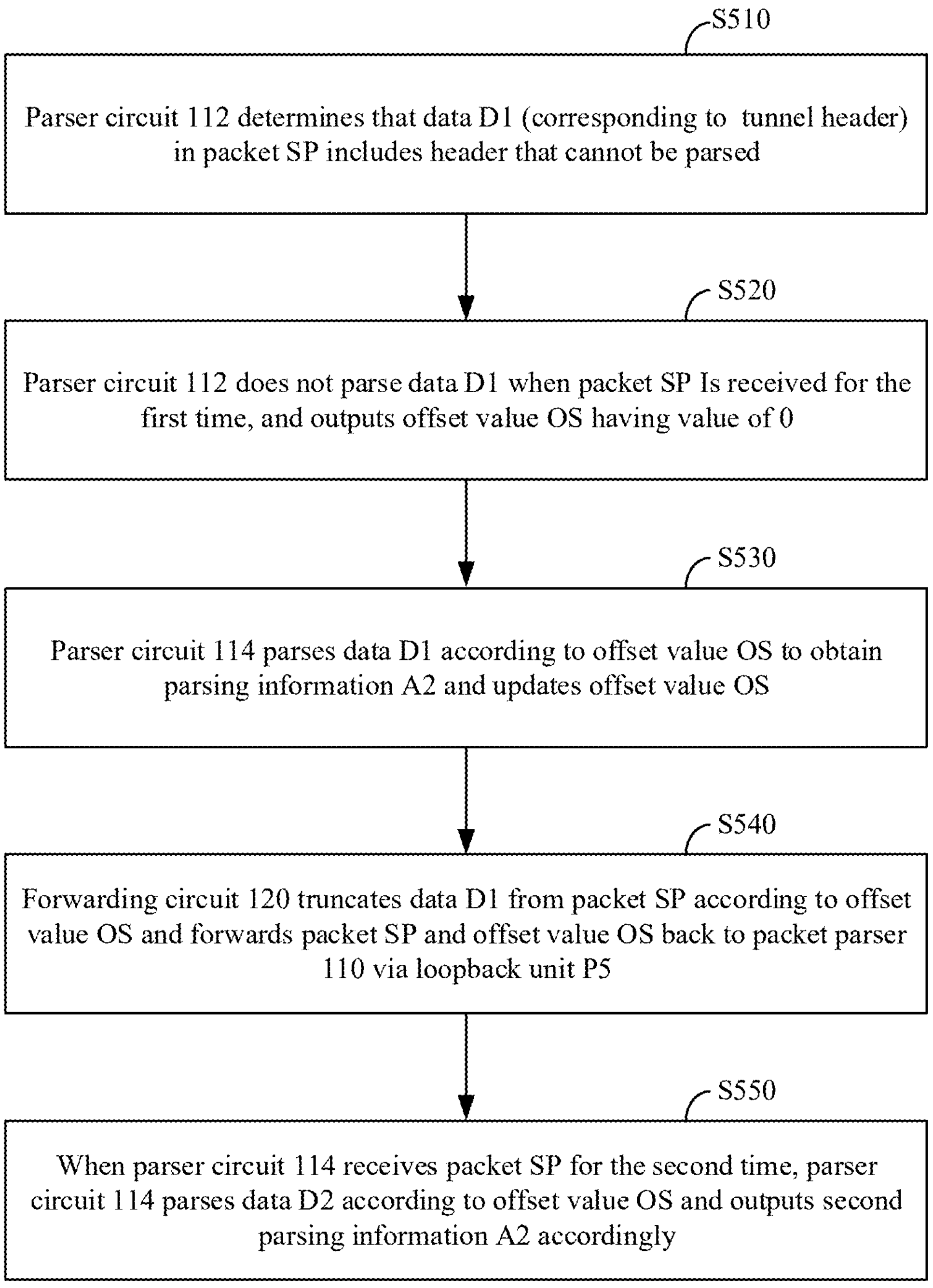
FIG. 5B illustrates a flowchart illustrating the operation of the communication device in FIG. 1 under the third scenario in FIG. 5A according to some embodiments of the present disclosure.

FIG. 5B illustrates a flowchart illustrating the operation of the communication device 100 in FIG. 1 under the third scenario in FIG. 5A according to some embodiments of the present disclosure. In operation S510, the parser circuit 112 determines that the data D1 (corresponding to the tunnel header) in the packet SP includes a header that cannot be parsed. In operation S520, the parser circuit 112 does not parse the data D1 when the packet SP is received for the first time (as the data D1 includes a header that cannot be parsed), and outputs the offset value OS having a value of 0. In operation S530, the parser circuit 114 parses the data D1 according to the offset value OS to obtain the parsing information A2 and updates the offset value OS. In operation S540, the forwarding circuit 120 truncates the data D1 from the packet SP according to the offset value OS and forwards the packet SP (which excludes the data D1 at this time) and the offset value OS back to the packet parser 110 via the loopback unit P5. In operation S550, when the parser circuit 114 receives the packet SP for the second time, the parser circuit 114 parses the data D2 according to the offset value OS and outputs the second parsing information A2 accordingly.

In this case, regardless of whether the data size of data D1 exceeds the maximum data size that the parser circuit 112 is able to parse in a single parsing process, as the data D1 includes a header that cannot be parsed by the parser circuit 112 (e.g., header 3), the parser circuit 112 does not process the data D1 during the first parsing, even though the parser circuit 112 receives the data D1, and thus outputs the offset value OS having a value of 0. Similar to the second scenario in FIG. 4A, as the offset value OS is 0, it indicates that the starting position of data D2 is 0. Therefore, the parser circuit 114 will consider the data D1 as the data D2 and parse the data D2, thereby obtaining the parsing information A2 (equivalent to the parsing information A1 obtained from data D1). Afterwards, the forwarding circuit 120 may utilize the loopback unit P5 to truncate the data D1 (i.e., the part of the data that has already been processed by the parser circuit 114) from the packet SP and forward the remaining data in the packet SP (equivalent to data D2 and the payload) to the packet parser 110 for a second parsing. As a result, the packet parser 110 may utilize the loopback unit P5 to perform multiple rounds of parsing of the packet SP, thereby obtaining the complete parsing information A1 (e.g., the parsing information A2 obtained from the first parsing) and parsing information A2.

From the second and third scenarios, it can be understood that, due to the higher parsing capability of the parser circuit 114, if the data size of data D1 exceeds the maximum data size that the parser circuit 112 is able to process in a single parsing, or if the data D1 includes a header that cannot be parsed by the parser circuit 112, the parser circuit 112 will not parse the data D1 and will output the offset value OS having a value of 0, the parser circuit 114, which has a higher parsing capability, can continue processing the data D1, and the packet SP can undergo rounds of parsing via the loopback unit P5. With this configuration, the packet parser 110 may perform complete parsing on various types of the packet SP.

Figure 6:
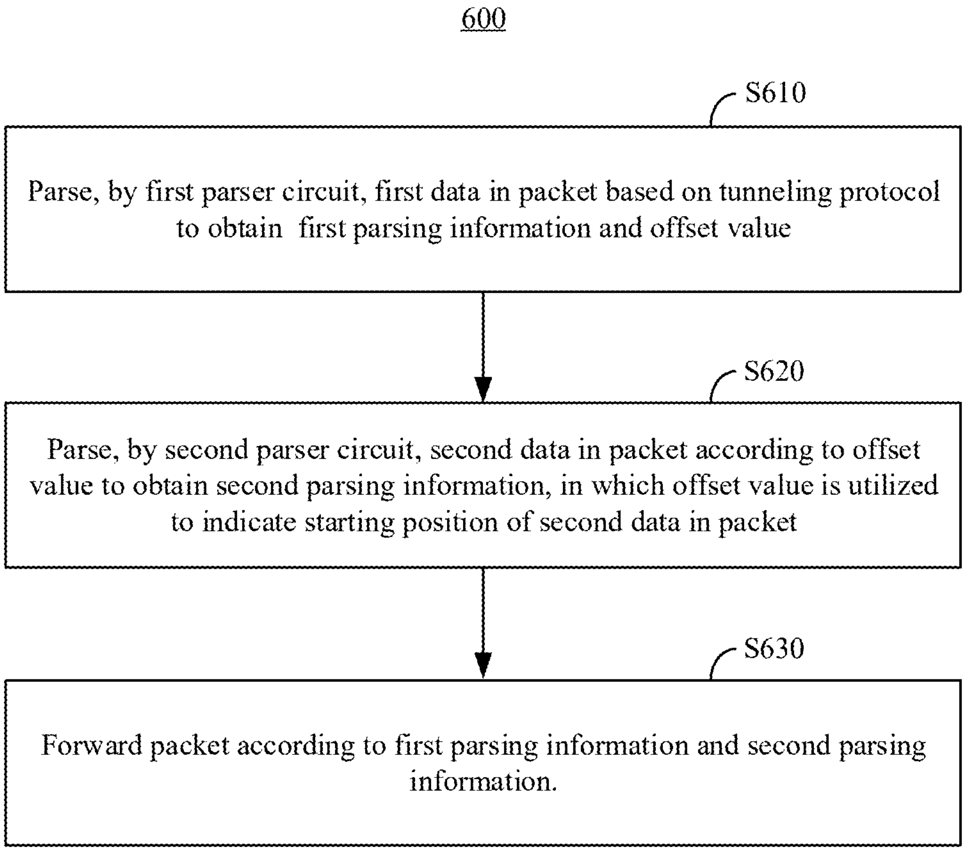
FIG. 6 illustrates a flowchart illustrating a packet processing method according to some embodiments of the present disclosure.

FIG. 6 illustrates a flowchart illustrating a packet processing method 600 according to some embodiments of the present disclosure. In some embodiments, the packet processing method 600 may be executed by the communication device 100 in FIG. 1, but the present disclosure is not limited thereto.

In operation S610, a first data in a packet is parsed by a first parser circuit based on a tunneling protocol to obtain a first parsing information and an offset value. In operation S620, a second data in the packet is parsed by a second parser circuit according to the offset value to obtain a second parsing information, in which the offset value is utilized to indicate a starting position of the second data in the packet. In operation S630, the packet is forwarded according to the first parsing information and the second parsing information.

The above operations of the packet processing method 600 can be understood with reference to above embodiments, and thus the repetitious descriptions are not further given. Operations of the packet processing method 600 include exemplary operations, but those operations are not necessarily performed in the order described above. Operations of the packet processing method 600 may be added, replaced, changed order, and/or eliminated, or the operations of the packet processing method 600 can be executed simultaneously or partially simultaneously as appropriate, in accordance with the spirit and scope of various embodiments of the present disclosure.

As described above, the communication device and packet processing method provided in some embodiments of the present disclosure may utilize two-phase packet parsing to handle general packets or packets that support tunneling protocols. If the data size of the packet is too large, the communication device and the packet processing method thereof may utilize a loopback unit to perform multiple rounds of parsing of the packet without relying on the central processing unit for parsing. As a result, excessive load on the central processing unit can be prevented.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A communication device, comprising:

a first parser circuit configured to parse first data in a packet based on a tunneling protocol to obtain first parsing information and an offset value;

a second parser circuit configured to parse second data in the packet according to the offset value to obtain second parsing information, wherein the offset value is utilized to indicate a starting position of the second data in the packet; and a forwarding circuit configured to forward the packet according to the first parsing information and the second parsing information, wherein if a sum of the offset value and a data size of the second data exceeds a first predetermined value, the forwarding circuit is configured to truncate the first data from the packet according to the offset value and forward the packet back to the second parser circuit via a loopback unit to obtain the second parsing information.

2. The communication device of claim 1, wherein the first parser circuit is further configured to obtain inner header type information according to the first data, and the second parser circuit is further configured to parse the second data according to the offset value and the inner header type information.

3. The communication device of claim 2, wherein the inner header type information is utilized to indicate whether the second data comprises a layer 2 header.

4. The communication device of claim 1, wherein the second parser circuit does not parse the second data when the packet is received for the first time.

5. The communication device of claim 1, wherein the first predetermined value is utilized to indicate a maximum data size that the first parser circuit and the second parser circuit are able to parse in a single parsing process.

6. The communication device of claim 1, wherein if a data size of the first data exceeds a second predetermined value or the first data comprises a header that is unable to be parsed by the first parser circuit, the second parser circuit is further configured to parse the first data to obtain the first parsing information, and the forwarding circuit is configured to truncate the first data from the packet according to the offset value and forward the packet back to the second parser circuit via the loopback unit to obtain the second parsing information.

7. The communication device of claim 6, wherein the first parser circuit does not parse the first data when the packet is received for the first time.

8. The communication device of claim 6, wherein the second predetermined value is utilized to indicate a maximum data size that the first parser circuit is able to parse in a single parsing process.

9. The communication device of claim 1, wherein the first data comprises an outer header that is set based on the tunneling protocol.

10. A packet processing method, comprising:

parsing, by a first parser circuit, first data in a packet based on a tunneling protocol and generating an offset value to obtain first parsing information;

parsing, by a second parser circuit, second data in the packet according to the offset value to obtain second parsing information, wherein the offset value is utilized to indicate a starting position of the second data in the packet;

forwarding the packet according to the first parsing information and the second parsing information; and if a sum of the offset value and a data size of the second data exceeds a first predetermined value, truncating the first data from the packet according to the offset value, and forwarding the packet back to the second parser circuit via a loopback unit to obtain the second parsing information.

11. The packet processing method of claim 10, further comprising:

obtaining inner header type information by the first parser circuit based on the first data, wherein the second parser circuit is further configured to parse the second data according to the offset value and the inner header type information.

12. The packet processing method of claim 11, wherein the inner header type information is utilized to indicate whether the second data includes a layer 2 header.

13. The packet processing method of claim 10, wherein the second parser circuit does not parse the second data when the packet is received for the first time.

14. The packet processing method of claim 10, wherein the first predetermined value is utilized to indicate a maximum data size that the first parser circuit and the second parser circuit are able to parse in a single parsing process.

15. The packet processing method of claim 10, further comprising:

if a data size of the first data exceeds a second predetermined value or the first data comprises a header that is unable to be parsed by the first parser circuit, parsing, by the second parser circuit, the first data to obtain the first parsing information; and truncating the first data from the packet according to the offset value, and forwarding the packet back to the second parser circuit via the loopback unit to obtain the second parsing information.

16. The packet processing method of claim 15, wherein the first parser circuit does not parse the first data when the packet is received for the first time.

17. The packet processing method of claim 15, wherein the second predetermined value is utilized to indicate a maximum data size that the first parser circuit is able to parse in a single parsing process.

18. The packet processing method of claim 10, wherein the first data comprises an outer header that is set based on the tunneling protocol.

19. A communication device, comprising:

a first parser circuit configured to parse first data in a packet based on a tunneling protocol to obtain first parsing information and an offset value;

a second parser circuit configured to parse second data in the packet according to the offset value to obtain second parsing information, wherein the offset value is utilized to indicate a starting position of the second data in the packet; and a forwarding circuit configured to forward the packet according to the first parsing information and the second parsing information, if a data size of the first data exceeds a predetermined value or the first data comprises a header that is unable to be parsed by the first parser circuit, the second parser circuit is further configured to parse the first data to obtain the first parsing information, and the forwarding circuit is configured to truncate the first data from the packet according to the offset value and forward the packet back to the second parser circuit via a loopback unit to obtain the second parsing information.

* * * * *